(12) United States Patent
Kim

(10) Patent No.: US 10,601,616 B2
(45) Date of Patent: Mar. 24, 2020

(54) CABLE ASSEMBLY AND METHOD FOR REDUCING IMPACTS OF COMMON-MODE NOISE

(71) Applicant: Andrew Joo Kim, Suwanee, GA (US)

(72) Inventor: Andrew Joo Kim, Suwanee, GA (US)

( * ) Notice: Subject to any disclaimer, the term of this patent is extended or adjusted under 35 U.S.C. 154(b) by 388 days.

(21) Appl. No.: 15/172,055

(22) Filed: Jun. 2, 2016

(65) Prior Publication Data
US 2016/0358695 A1  Dec. 8, 2016

Related U.S. Application Data

(60) Provisional application No. 62/170,125, filed on Jun. 2, 2015.

(51) Int. Cl.
*H01B 7/30* (2006.01)
*H04L 25/08* (2006.01)
*H04L 25/02* (2006.01)

(52) U.S. Cl.
CPC ........ *H04L 25/085* (2013.01); *H04L 25/0274* (2013.01)

(58) Field of Classification Search
CPC ... A61B 5/0402; A61B 5/0006; A61B 5/0488; A61B 5/02055; A61B 5/0476
See application file for complete search history.

(56) References Cited

U.S. PATENT DOCUMENTS

| | | | |
|---|---|---|---|
| 2010/0244998 A1* | 9/2010 | Peyton | G01R 31/022 333/24 R |
| 2012/0021640 A1* | 1/2012 | Masuda | H04L 25/0272 439/502 |
| 2012/0144088 A1* | 6/2012 | Chen | G06F 13/4269 710/316 |

* cited by examiner

*Primary Examiner* — Sibin Chen
(74) *Attorney, Agent, or Firm* — Trellis IP Law Group, PC

(57) ABSTRACT

A cable assembly improves the signal integrity of high-speed differential data communicated from a host to a device by removing common-mode noise at the device end of the cable before it can enter the device. The cable includes a differential pair of conductors, a ground conductor, and a common-mode suppressor circuit with differential inputs and outputs. The common-mode suppressor circuit forwards differential signals from its inputs to its outputs, but reduces common-mode voltages. It returns common-mode currents to the host via the ground conductor. The common-mode suppressor circuit may include passive and/or active circuits, and may be implemented as an integrated circuit.

12 Claims, 5 Drawing Sheets

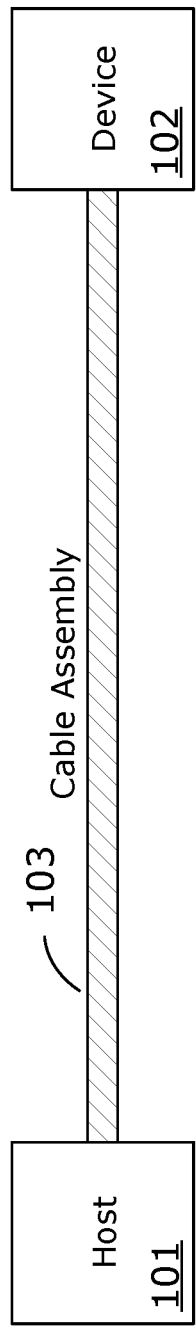
Fig. 1 – Prior Art
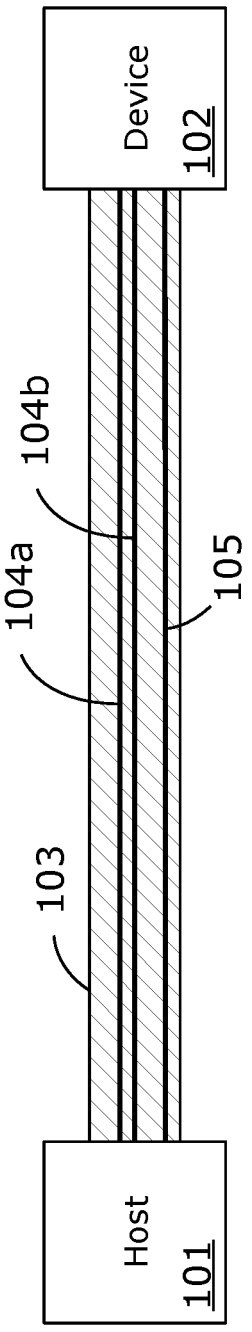
Fig. 2 – Prior Art

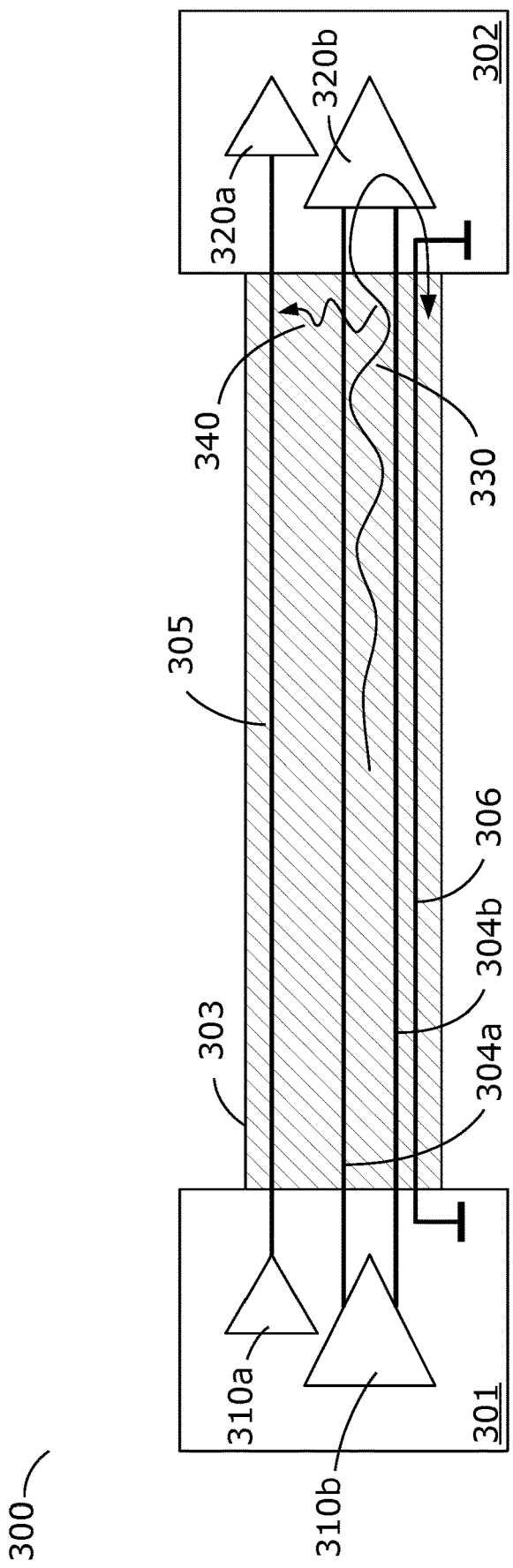
Fig. 3 – Prior Art

CABLE ASSEMBLY AND METHOD FOR REDUCING IMPACTS OF COMMON-MODE NOISE

CROSS REFERENCES TO RELATED APPLICATIONS

This application claims priority from U.S. Provisional Patent Application Ser. No. 62/170,125, entitled METHOD AND SYSTEM FOR REDUCING THE IMPACT OF COMMON-MODE NOISE, filed on Jun. 2, 2015, which is hereby incorporated by reference as if set forth in full in this application for all purposes.

BACKGROUND

The present application relates in general to communication systems transferring data between a host and a device using differential signals traveling through a differential pair of conductors in a cable assembly. Common-mode noise signals, from a variety of potential sources, may add to a desired differential data signal, exit the cable assembly and enter the device where it can degrade the quality not only of the underlying differential data signal carried on the differential pair of conductors, but also of other signals in close proximity.

In the context of this document, data may be analog or digital or, more generally data may be represented by continuous or discrete levels, and at continuous or discrete times. Some data may be transferred according to a high-speed data protocol. Common-mode noise signals may include random (stochastic) and non-random signals that may be caused by a variety of physical processes.

As a differential signal travels over the cable assembly's differential pair of conductors, an undesired phenomenon called "mode conversion" can occur whereby some of the differential signal is transformed into a common-mode signal component. Mode conversion is due to less than ideal isolation between two conductors of the differential pair and practical manufacturing constraints leading to the two conductors not being perfectly matched. These practical limitations are even more pronounced with thinner gauge conductors, which are used to produce thin, light cable assemblies. Two example applications where cable weight and size are of paramount importance are virtual reality and augmented reality headset devices. Unfortunately, these are also applications that demand high resolution video, high-quality audio, and that carry a multitude of other data signals, both low-speed and high-speed.

In this situation, a common-mode signal component can arise on the conductors of the differential pair when it is in the presence of electromagnetic interference (EMI). The source of the interference may be due to electromagnetic coupling from a single-ended signal conductor, electromagnetic coupling from another differential conductor pair, or from a source external to the cable assembly.

The problem with the common-mode signal is threefold. First, a differential receiver at the receiving end of the cable assembly is expecting a differential signal, and the effect of the common-mode component can degrade the quality of the reception, possibly resulting in errors. In particular, each input of a differential receiver is typically set at an optimized bias voltage around which the differential signal fluctuates. But the addition of a common-mode signal component perturbs the receiver input from this optimized point—potentially resulting in poorer reception performance.

Another negative impact of the common-mode signal component is that it will return through the ground terminals between the device and the cable. In many applications, the device has a floating ground, i.e. its only connection to ground is through the cable assembly, so imparting the common-mode signal into the local device ground will perturb the ground seen by other circuits on the device. Some of these circuits may be particularly sensitive to ground noise. For example, in display drivers used in headsets the ground noise may cause speckling, blurring, color bleeding, or other visual distortions.

A third drawback of the common-mode signal component is that it is more prone to emit EMI and cause interference for other signals. Differential signals are used because the radiation emitted by each of the two conductors (in the differential pair) tends to cancel the other one out, resulting in lower overall EMI. However, if there is a common-mode component on the differential conductor pair, then not only will the two fields not cancel; they will in fact tend to constructively add resulting in higher emitted radiation. This EMI can then impinge on other conductors nearby, and single-ended conductors will be particularly vulnerable to picking up this EMI. The result can be errors in the reception of low-bandwidth signals that may be carried on the single-ended conductors.

FIG. 1 illustrates components in a conventional data link that includes a cable assembly. Communication system 100 comprises one terminal 101 called a host which drives at least one signal to another terminal 102 called a device. The signal is carried from host 101 to device 102 by way of a cable assembly 103, which may carry other signals as well. Cable assembly 103 comprises at least one differential conductor pair to reduce a common-mode signal component delivered to a differential receiver inside device 103.

FIG. 2 illustrates further detail of components in the cable assembly 103. It may include one or more differential signal pairs of conductors (a first differential pair is illustrated as 104*a-b*) and optionally one or more single-ended conductors (a first single-ended conductor is illustrated as 105). High-bandwidth data is conventionally carried over differential pairs of conductors. This may include content such as video and audio (e.g., according to a High-Definition Multimedia Interface (HDMI), Mobile High-Definition Link (MHL), or DisplayPort standard). It can also include carrying more generic data for example according to a protocol such as, but not limited to, Universal Serial Bus (USB) or Peripheral Component Interconnect Express (PCI Express), where data can flow in each direction.

A cable assembly such as 103 in many cases comprises one or more single-ended conductors used to carry power or lower bandwidth signals. This can include a power supply for the device; a ground return; control signals such as Inter-Integrated Circuit ($I^2C$), universal asynchronous receiver/transmitter (UART), or Serial Peripheral Interface (SPI) signals; analog audio signals; digital audio signals such as Inter-IC Sound ($I^2S$), Sony/Philips Digital Interface Format (S/PDIF), pulse-density modulation (PDM), or pulse-code modulation (PCM); and sensor data. These low-bandwidth signals may be sourced by either the host or device depending on the system configuration.

FIG. 3 illustrates common-mode related impairments in a conventional link to a device. A traditional communication system 300 includes host 301, device 302, and cable assembly 303. The cable assembly 303 includes differential pair of conductors 304*a-b*, a single-ended conductor 305, and ground conductor 306. Host 301 includes driver circuit 310*a* for the single-ended conductor 305, and differential driver circuit 310b for differential pair of conductors 304a-b. Device 302 includes receive circuit 320a for signals on single-ended conductor 305, and differential receiver 320b for differential signals on differential pair of conductors 304a-b. The system is perturbed by common-mode signal 330.

Differential receiver 320b expects a differential signal and the effect of the common-mode component 330 can degrade the quality of the reception, possibly resulting in errors. In particular, each input of differential receiver 320b is typically set at an optimized bias voltage around which the differential signal fluctuates. But the addition of a common-mode signal component perturbs the receiver 320b input from this optimized point potentially resulting in poorer reception performance.

Common-mode signal component 330 will return via device 302 and differential receiver 340 through ground conductor 306. In many applications, the device 302 has a floating ground, i.e. its only connection to ground is through the cable 303, so imparting the common-mode signal into the local device ground will perturb the ground seen by other circuits on the device 302. Some of these circuits may be particularly sensitive to ground noise. For example, in display drivers used in headsets the ground noise may cause speckling, blurring, color bleeding, or other visual distortions in the display.

A further drawback of the common-mode signal component 330 is that it is more prone to emit EMI and cause interference for other signals. Differential signals are used because the radiation emitted by each conductor 304a-b in the differential pair tends to cancel the other out resulting in lower overall EMI. However, if there is a common-mode component 330 on the differential pair of conductors 304a-b, then the two fields will not cancel; they will in fact tend to constructively add resulting in higher emitted radiation 340. This EMI 340 can then impinge on other conductors nearby, and single-ended conductors 305 will be particularly vulnerable to picking up this EMI. The result can be errors in the reception of the low-bandwidth signals carried on the single-ended conductors 305.

One example, among many, of such a communication system is a headset or visual reality goggle linked to an audiovisual device using a high-speed data cable, for example according to an HDMI, MHL, or DisplayPort standard, or another standard for the transfer of high-speed audiovisual data. Other examples of such systems include USB and PCI Express.

SUMMARY

The present application relates in general to communication systems transferring data between a host and a device using differential signals traveling through a differential pair of conductors in a cable assembly. Common-mode noise signals, from a variety of sources, may add to a desired differential data signal, exit the cable assembly and enter the device where it can degrade the quality not only of the underlying data signal carried on the differential pair of conductors, but also of other signals in close proximity on the device.

Embodiments of the invention include a cable assembly and method for improving the fidelity of such a communication system. They reduce undesired common-mode signal voltage components from a signal before they exit the cable assembly at the device end, and return common-mode signal current components via a ground conductor. As a result, a cleaner signal emanates from the cable assembly in that there is less electromagnetic interference coupled into nearby signal paths, there is less deviation from the receiver's intended biasing voltage, and there is less noise injected onto the device ground plane.

In a first aspect, embodiments of the invention include a cable assembly for communicating first high-speed differential data from a host to a device, comprising: a first differential pair of conductors for carrying at least a first portion of the first high-speed differential data from the host to the device, wherein the first differential pair of conductors is configured to be electrically coupled with a first differential driver included in the host; a ground conductor; and a first common-mode suppressor circuit with differential inputs and differential outputs, the differential inputs being electrically coupled with the first differential pair of conductors, wherein the first common-mode suppressor circuit is configured to: (a) receive data at its differential inputs, wherein the data may include both first differential-mode signals and first common-mode signals; (b) present the first differential-mode signals at its differential outputs; (c) at least reduce the first common-mode signals at its differential outputs; (d) return first common-mode signals to the host end of the cable assembly via the ground conductor; and (e) be electrically coupled via its differential outputs with differential inputs of a first differential receiver included in the device.

The first common-mode suppressor circuit may be located at a device end of the cable assembly, and it may be located inside a connector. The first common-mode suppressor circuit comprises passive and/or active circuits. It tolerates larger common-mode signals than a differential receiver included in the device, and it may be implemented as an integrated circuit.

The cable assembly may include one or more single-ended conductors for carrying power and/or lower bandwidth signals. It may include additional differential pairs of conductors and additional common-mode suppressor circuits. And the cable may be bidirectional.

In a second aspect, embodiments of the invention may include a method for reducing the impact of common-mode noise on high-speed differential data communicated from a host to a device via a cable assembly, comprising: forwarding the high-speed differential data from the host to differential inputs of a common-mode suppressor circuit at a device end of the cable assembly, the common-mode suppressor circuit further having differential outputs; in the common-mode suppressor circuit: (a) forwarding received high-speed differential data to the differential outputs; (b) at least reducing common-mode noise at the differential outputs; (c) returning common-mode noise return signals via a ground conductor to the host; and forwarding the differential data with reduced common-mode noise signals from the common-mode suppressor circuit to the device.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIG. 1 illustrates components in a conventional data link that includes a cable assembly;

FIG. 2 illustrates further detail of components in the cable assembly;

FIG. 3 illustrates common-mode related impairments in a conventional link to a device;

DETAILED DESCRIPTION

The present invention relates in general to communication systems transferring data between a host and a device using differential signals traveling through a differential pair of conductors in a cable assembly. Common-mode noise signals, from a variety of potential sources, may add to a desired differential data signal, exit the cable assembly and enter the device where it can degrade the quality not only of the underlying data signal carried on the differential pair of conductors, but also of other signals in close proximity on the device.

Figure 4:
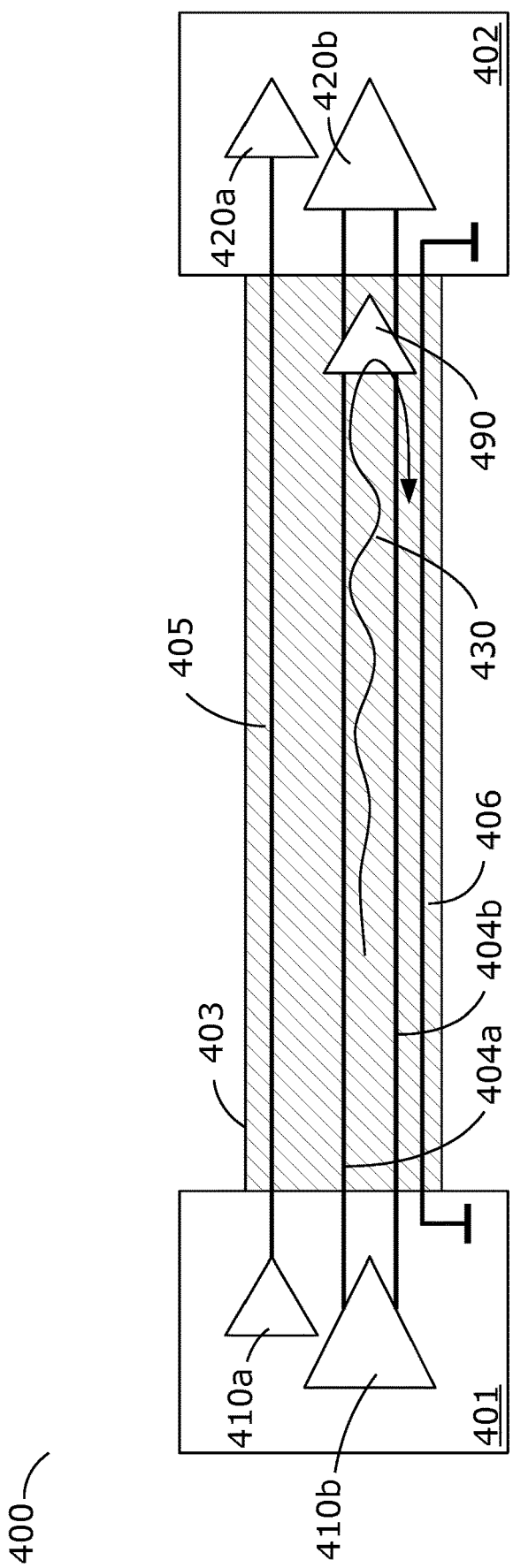
FIG. 4 illustrates in-cable common-mode suppression according to an embodiment of the invention.

FIG. 4 illustrates in-cable common-mode suppression according to an embodiment 400 of the invention. Communication system 400 includes host 401, device 402, and cable assembly 403. Cable assembly 403 includes differential pair of conductors 404a-b, single-ended conductor 405, and ground conductor 406. Host 401 includes driver circuit 410a for the single-ended conductor 404, and differential driver circuit 410b for differential pair of conductors 404a-b. Device 402 includes receive circuit 420a for signals on single-ended conductor 405, and differential receiver 420b for differential signals from differential pair of conductors 404a-b. However, the differential pair of conductors 404a-b is coupled to differential inputs of common-mode suppressor circuit 490 which is located inside cable assembly 403, and which has differential outputs coupled with the differential inputs of differential receiver 420b inside the device.

The system is perturbed by common-mode signal 430. However, common-mode suppressor circuit 490 has a high common-mode rejection ratio to suppress the common-mode signal component 430 and return it via the ground, drain, and/or shield conductor 406 of the cable. Because the common-mode signal does not enter the device 402, there is less degradation of the received signal. In particular, the differential receiver 420b operates closer to its designed optimal biasing voltage, the device's ground reference is cleaner, and single-ended conductors such as 405 are not corrupted with EMI from common-mode signal 430.

Embodiments may locate common-mode suppressor circuit 490 at the device end of the cable assembly 403. By placing it there, in contrast to for example the host end or the middle of the cable, there is less chance for subsequent common-mode regrowth from either mode conversion or incoming interference.

In yet other embodiments of the invention, common-mode suppressor circuit 490 could perform other signal integrity enhancing operations such as equalization. That would allow achieving additional signal integrity benefits due to correction of distortion arising from frequency-dependent cable losses.

Common-mode suppressor circuit 490 is configured to receive data at its differential inputs, wherein the data may include both differential-mode signals and common-mode signals; to present differential-mode signals at its differential outputs; to reduce or remove the common-mode signals; to return common-mode signals to the host end of the cable assembly via the ground conductor and to be coupled via its differential outputs with differential inputs of differential receiver 420b included in device 402. Embodiments may use passive and/or active circuits for common-mode suppressor circuit 490. For example, a passive circuit may comprise a transformer whose primary winding is electrically coupled to differential pair of conductors 404a-b and whose secondary winding is electrically coupled to differential receiver 420b inputs. Another passive circuit may comprise a filter, if common-mode signals are expected to encompass a different frequency spectrum than differential-mode signals. The filter could effectively short-circuit common-mode signals to ground, while passing differential-mode signals on to differential receiver 420b. An example of an active circuit may comprise an amplifier with differential inputs and differential outputs, wherein transistors coupled with the differential inputs can tolerate a large range of common-mode voltages. In some embodiments, common-mode suppressor circuit 490 may comprise both one or more passive circuits and one or more active circuits. In further embodiments, common-mode suppressor circuit 490 may be implemented as an integrated circuit (IC).

In yet further embodiments, the high-speed data could be transferred according to a standard protocol, such as, but not limited to, USB or PCI Express.

Figure 5:
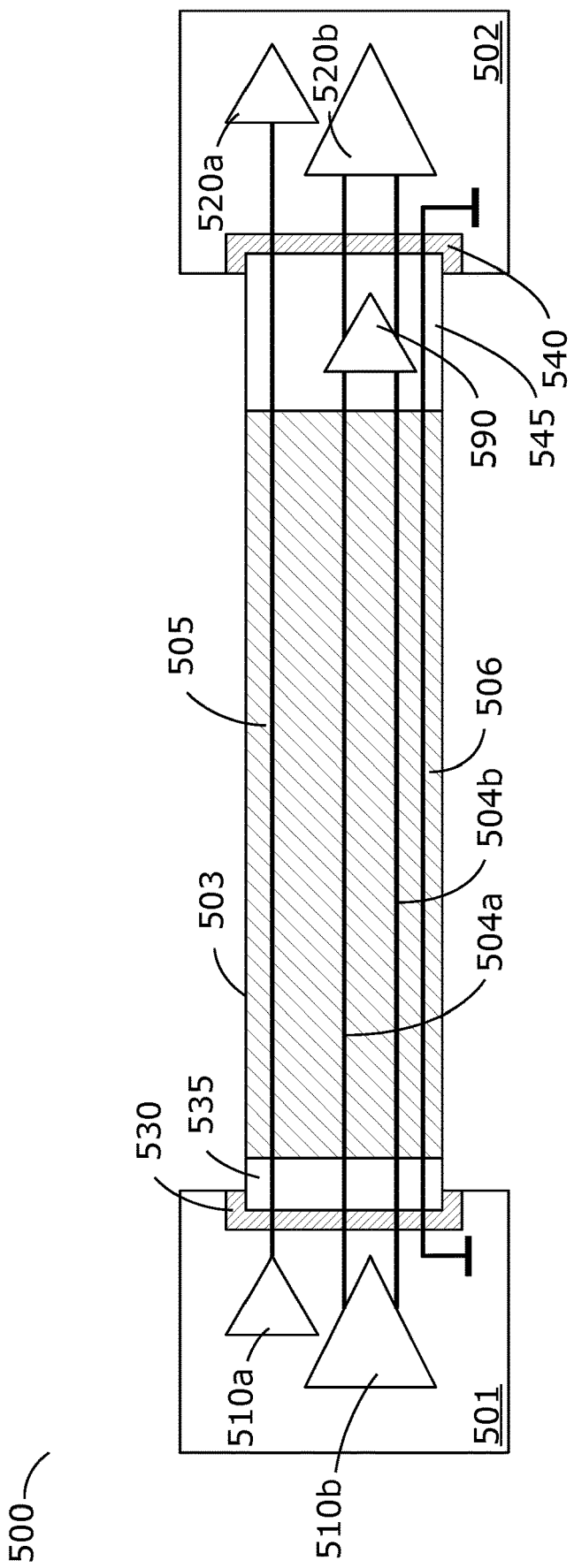
FIG. 5 illustrates an embodiment of the invention in a cable assembly with connectors to a host and a device.

FIG. 5 illustrates an embodiment 500 of the invention in a cable assembly 503 with connectors 535 and 545 to a host 501 and a device 502. Host 501 includes single-ended data driver 510a, differential data driver 510b, and host-included connector 530. Device 502 includes single-ended data receiver 520a, differential data receiver 520b, and device-included connector 540. Cable assembly 503 includes host cable connector 535, device cable connector 545, differential conductors 504a-b for coupling differential data driver 510b with differential data receiver 520, single-ended conductor 505 for coupling single-ended data driver 510a with single-ended data receiver 520a, and common-mode suppressor circuit 590, which may be situated inside device cable connector 545. Cable 503 may further comprise ground conductor 506. Host cable connector 535 is configured to electrically and mechanically couple the cable assembly with the host, via host-included connector 530. Device cable connector 535 is configured to electrically and mechanically couple the cable assembly with the device, via device-included connector 540.

Cable assembly 503 may be disconnected from host 501 by unplugging host cable connector 535 from host-included connector 530. Cable assembly 503 may be disconnected from device 502 by unplugging device cable connector 545 from device-included connector 540. Therefore, cable assembly 503 may include a full embodiment of the invention, and it can be used with various other hosts and other devices, reducing common-mode interference for each host-device pair that it connects.

Figure 6:
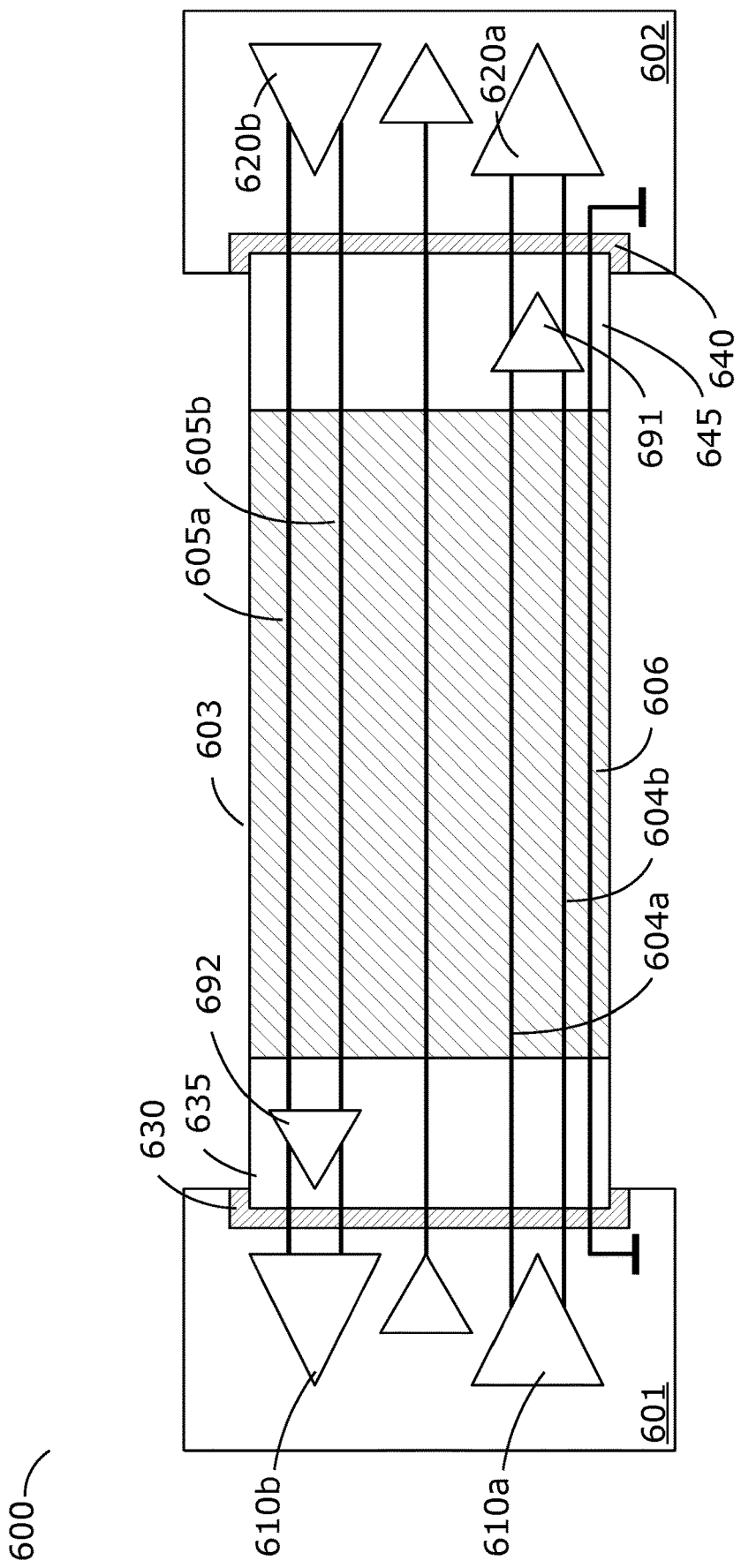
FIG. 6 illustrates common-mode suppression in a bidirectional cable according to an embodiment of the invention.

FIG. 6 illustrates common-mode suppression in a bidirectional cable according to an embodiment of the invention. Example 600 shows a first bidirectional communication terminal 601, a second bidirectional communication terminal 602, and cable assembly 603. First bidirectional communication terminal 601 includes differential data driver 610a, differential data receiver 610b, and first terminal connector 630. Second bidirectional communication terminal 602 includes differential data driver 620b, differential data receiver 620a, and second terminal connector 640. Cable assembly 603 includes first connector 635, second connector 645, differential conductors 604a-b for coupling differential data driver 610a with differential data receiver 620a, differential conductors 605a-b for coupling differential data driver 620*b* with differential data receiver 610*b*, first common-mode suppressor circuit 691, which may be situated inside second connector 645, and second common-mode suppressor circuit 692, which may be situated inside first connector 635. Cable 603 may further comprise ground conductor 606.

Cable assembly 603 may be disconnected from first bidirectional communication terminal 601 by unplugging first connector 635 from first terminal connector 630. Cable assembly 603 may be disconnected from second bidirectional communication terminal 602 by unplugging second connector 645 from second terminal connector 640. Therefore, cable assembly 603 may include a full embodiment of the invention, and it can be used with various other bidirectional communication terminals, reducing common-mode interference for each pair that it connects.

In a further embodiment of the invention, there may be multiple "lanes" of high-speed data in one or both directions. Each lane may comprise a differential pair of conductors, and each lane may comprise a common-mode suppressor circuit placed at its receive end, and for example located inside the first (635) or second (645) connector.

Although the description has been described with respect to particular embodiments thereof, these particular embodiments are merely illustrative, and not restrictive. Embodiments of the invention may be utilized in conjunction with any type of data encoding and/or data protocol known in the art. Example embodiments shown in FIGS. 4-6 include a single-ended conductor and a ground conductor. However, other embodiments may not have either of these, and simply comprise one or more differential pairs of conductors.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A cable assembly for communicating first high-speed differential data from a host to a device, comprising:
   a first differential pair of conductors for carrying at least a first portion of the first high-speed differential data from the host to the device, wherein the first differential pair of conductors is configured to be electrically coupled with a first differential driver included in the host;
   a ground conductor; and
   a first common-mode suppressor circuit with differential inputs and differential outputs, the differential inputs being electrically coupled with the first differential pair of conductors, wherein the first common-mode suppressor circuit is configured to: (a) receive data at its differential inputs, wherein the data may include both first differential-mode signals and first common-mode signals; (b) present the first differential-mode signals at its differential outputs; (c) at least reduce the first common-mode signals at its differential outputs; (d) return first common-mode signals to a host end of the cable assembly via the ground conductor; and (e) be electrically coupled via its differential outputs with differential inputs of a first differential receiver included in the device; and wherein the first common-mode suppressor circuit is located at a device end of the cable assembly.

2. The cable assembly of claim 1, further comprising a device cable connector configured to electrically and mechanically couple the cable assembly with the device, and wherein the first common-mode suppressor circuit is located in the device cable connector.

3. The cable assembly of claim 1, wherein the first common-mode suppressor circuit comprises at least one of passive and active circuits.

4. The cable assembly of claim 1, wherein the first common-mode suppressor circuit tolerates larger common-mode signals than a differential receiver included in the device.

5. The cable assembly of claim 1, wherein the first common-mode suppressor circuit is implemented as an integrated circuit.

6. The cable assembly of claim 1, wherein the first common-mode suppressor circuit additionally performs other signal integrity enhancing operations.

7. The cable assembly of claim 1, further comprising one or more single-ended conductors for carrying at least one of power and lower bandwidth signals.

8. The cable assembly of claim 1, further comprising additional differential pairs of conductors for carrying additional portions of the first high-speed differential data from the host to the device, and additional common-mode suppressor circuits.

9. The cable assembly of claim 1, further comprising:
   a second differential pair of conductors for carrying at least a first portion of second high-speed differential data from the device to the host, wherein the second differential pair of conductors is configured to be electrically coupled with a second differential driver included in the device;
   a second common-mode suppressor circuit with differential inputs and differential outputs, the differential inputs being electrically coupled with the second differential pair of conductors, wherein the second common-mode suppressor circuit is configured to: (a) receive data at its differential inputs, wherein the data may include both second differential-mode signals and second common-mode signals; (b) present the second differential-mode signals at its differential outputs; (c) at least reduce the second common-mode signals at its differential outputs; (d) return second common-mode signals to a device end of the cable assembly via the ground conductor; and (e) be electrically coupled via its differential outputs with differential inputs of a second differential receiver included in the host.

10. The cable assembly of claim 1, wherein the first high-speed data is transferred according to a standard protocol.

11. The cable assembly of claim 10, wherein the standard protocol includes one of USB and PCI Express.

12. A method for reducing impacts of common-mode noise on high-speed differential data communicated from a host to a device via a cable assembly, comprising:

forwarding the high-speed differential data from the host to differential inputs of a common-mode suppressor circuit at a device end of the cable assembly, wherein the common-mode suppressor circuit is located at a device end of the cable assembly, the common-mode suppressor circuit further having differential outputs;

in the common-mode suppressor circuit:
(a) forwarding received high-speed differential data to the differential outputs;
(b) at least reducing common-mode noise at the differential outputs;
(c) returning common-mode noise return signals via a ground conductor to the host; and forwarding the differential data with reduced common-mode noise signals from the common-mode suppressor circuit to the device.

\* \* \* \* \*